US011252695B2

(12) United States Patent
Harada et al.

(10) Patent No.: US 11,252,695 B2
(45) Date of Patent: Feb. 15, 2022

(54) USER TERMINAL AND RADIO COMMUNICATION METHOD

(71) Applicant: NTT DOCOMO, INC., Tokyo (JP)

(72) Inventors: Hiroki Harada, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 16 days.

(21) Appl. No.: 16/609,549

(22) PCT Filed: May 2, 2017

(86) PCT No.: PCT/JP2017/017307
§ 371 (c)(1),
(2) Date: Oct. 30, 2019

(87) PCT Pub. No.: WO2018/203408
PCT Pub. Date: Nov. 8, 2018

(65) Prior Publication Data
US 2020/0145961 A1    May 7, 2020

(51) Int. Cl.
*H04W 72/00* (2009.01)
*H04L 5/00* (2006.01)
*H04W 48/10* (2009.01)
*H04W 72/04* (2009.01)

(52) U.S. Cl.
CPC ......... *H04W 72/005* (2013.01); *H04L 5/0053* (2013.01); *H04W 48/10* (2013.01); *H04W 72/042* (2013.01); *H04W 72/044* (2013.01)

(58) Field of Classification Search
CPC ........... H04W 72/005; H04W 72/0042; H04W 72/0044; H04W 48/10; H04L 5/0053
See application file for complete search history.

(56) References Cited

U.S. PATENT DOCUMENTS

| 10,615,897 | B2 * | 4/2020 | Islam ................... H04L 27/2692 |
| 2014/0293843 | A1 * | 10/2014 | Papasakellariou ........ H04L 1/00 370/280 |
| 2017/0019915 | A1 * | 1/2017 | Nogami ................ H04L 5/0053 |
| 2017/0078126 | A1 * | 3/2017 | Einhaus ............. H04W 72/042 |

(Continued)

FOREIGN PATENT DOCUMENTS

| WO | 2014165678 A2 | 10/2014 |
| WO | 2015-149213 A1 | 10/2015 |
| WO | 2016-070417 A1 | 5/2016 |
| WO | 2016/120462 A1 | 8/2016 |

OTHER PUBLICATIONS

Office Action issued in the counterpart Japanese Patent Application No. 2019-516344, dated Aug. 4, 2020 (8 pages).

(Continued)

*Primary Examiner* — Jamal Javaid
*Assistant Examiner* — Ryan C Kavleski
(74) *Attorney, Agent, or Firm* — Osha Bergman Watanabe & Burton LLP

(57) ABSTRACT

A terminal is disclosed including a receiver that receives downlink control information that includes a resource assignment information of which a bit size is configured depending on a type of a signal, and a processor that determines a resource assignment based on the resource assignment information. In other aspects, a radio communication method is also disclosed.

7 Claims, 10 Drawing Sheets

(56) References Cited

U.S. PATENT DOCUMENTS

2017/0290017 A1* 10/2017 Takeda .............. H04W 72/0453
2019/0356524 A1* 11/2019 Yi ......................... H04L 5/0094

OTHER PUBLICATIONS

3GPP TS 36.300 V8.12.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action issued in the counterpart European Patent Application No. 17908376.1, dated Oct. 19, 2020 (12 pages).
International Search Report issued in Application No. PCT/JP2017/017307, dated Jul. 25, 2017 (1 page).
Written Opinion issued in International Application No. PCT/JP2017/017307, dated Jul. 25, 2017 (3 pages).
3GPP TSG-RAN WG1 #87; R1-1613057 "Sync raster considerations below 6GHz" Qualcomm Incorporated; Reno, USA; Nov. 14-18, 2016 (4 pages).
3GPP TSG-RAN WG1 #88bis; R1-1705569 "Remaining system information delivery consideration" Qualcomm Incorporated; Spokane, USA; Apr. 3-7, 2017 (2 pages).
Extended European Search Report issued in European Application No. 17908376.1, dated Feb. 22, 2021 (17 pages).
Extended European Search Report issued for Application No. 21187426.8, dated Aug. 31, 2021.

* cited by examiner

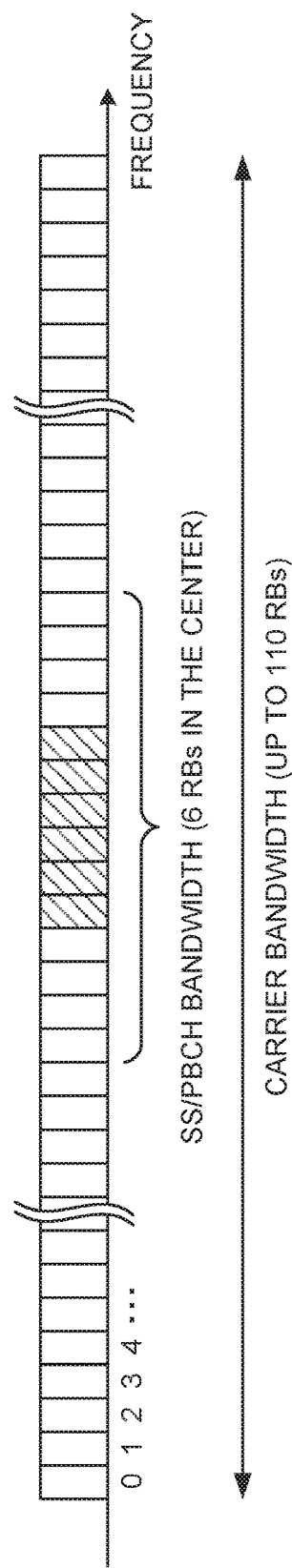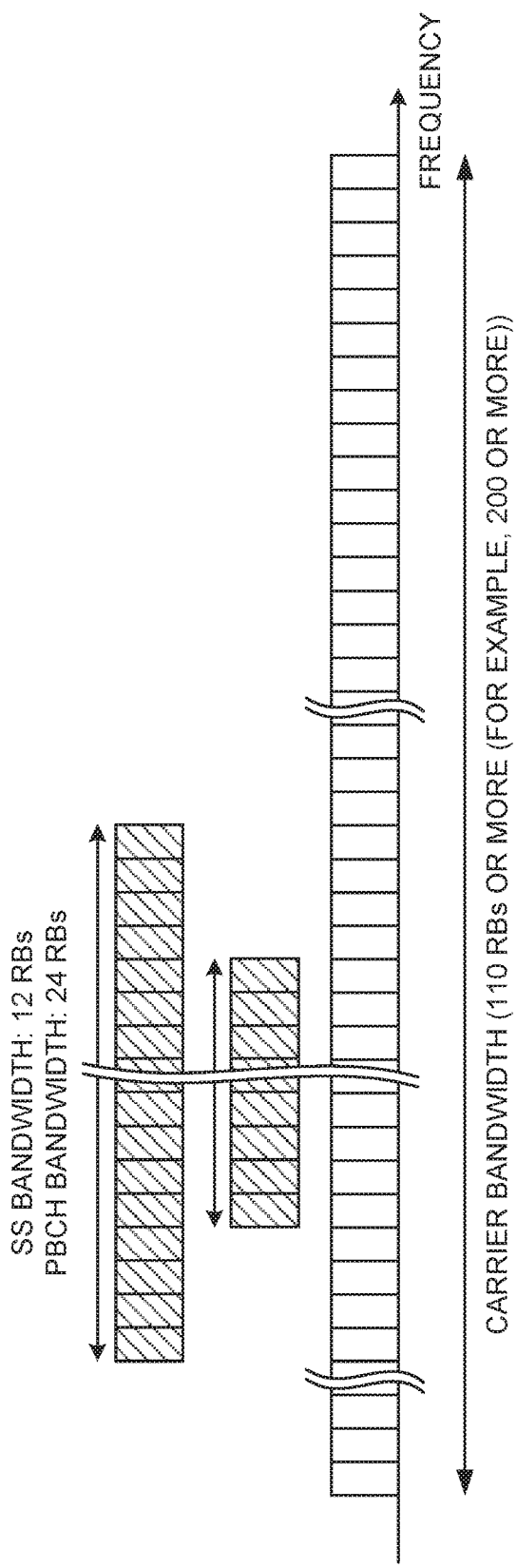

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," "LTE Rel. 12" or "LTE Rel. 13") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "NR (New Radio)," "NX (New radio access)," "FX (Future generation radio access)," "LTE Rel. 14," "LTE Rel. 15" or later versions) are under study.

In LTE Rel. 10/11, carrier aggregation (CA) to integrate multiple component carriers (CC) is introduced in order to achieve broadbandization. Each CC is configured with the system bandwidth of LTE Rel. 8 as 1 unit. In addition, in CA, multiple CCs under the same radio base station (eNB (eNodeB)) are configured in a user terminal (UE (User Equipment)).

Meanwhile, in LTE Rel. 12, dual connectivity (DC), in which multiple cell groups (CGs) formed with different radio base stations are configured in a UE, is also introduced. Each cell group is comprised of at least 1 cell (or CC). In DC, since multiple CCs of different radio base stations are integrated, DC is also referred to as "inter-eNB CA."

Also, in existing LTE systems (for example, LTE Rel. 8 to 13), synchronization signals (PSS/SSS), broadcast channel (PBCH) and so on which a user terminal uses in initial access procedures are allocated, on a fixed basis, in fields that are determined in advance. By detecting the synchronization signals in cell search, the user terminal can establish synchronization with the network, and, furthermore, identify the cell (for example, cell ID) which the user terminal should connect with. Furthermore, the user terminal can acquire system information by receiving the broadcast channel (PBCH and SIB) after the cell search.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

Future radio communication systems (for example, 5G, NR, etc.) are expected to realize various radio communication services so as to fulfill mutually varying requirements (for example, ultra high speed, large capacity, ultra-low latency, etc.). For example, regarding 5G/NR, studies are in progress to provide radio communication services, referred to as "eMBB (enhanced Mobile Broad Band)," "IoT (Internet of Things)," "mMTC (massive Machine Type Communication)," "M2M (Machine To Machine)," and "URLLC (Ultra Reliable and Low Latency Communications)."

In addition, 5G/NR is expected to support flexible use of numerologies and frequencies, and realize dynamic frame configurations. Here, "numerology" refers to communication parameters in the frequency direction and/or the time direction (for example, at least one of the subcarrier spacing (subcarrier interval), the bandwidth, the symbol duration, the time duration of CPs (CP duration), the subframe duration, the time duration of TTIs (TTI duration), the number of symbols per TTI, the radio frame configuration, the filtering process, the windowing process, and so on).

Furthermore, 5G/NR are under research to provide services by using very high carrier frequencies such as 100 GHz, for example, and there is an expectation that the frequency band to use for communication will expand, compared to existing LTE systems. In this case, if a control procedure (for example, a resource assignment method) based on an existing LTE system is used on an as-is basis, increased overhead of information (for example, resource assignment information) to report to user terminals, and/or increased load of transmitting/receiving processes in user terminals might make it difficult to communicate properly.

The present invention has been made in view of the above, and it is therefore an object of the present invention to provide a user terminal and a radio communication method, whereby signaling overhead and/or the load on user terminals for transmitting/receiving signals from increasing in a radio communication system in which communication is performed based on different configurations than existing LTE systems.

Solution to Problem

According to one aspect of the present invention, a user terminal has a receiving section that receives downlink control information that schedules a predetermined signal, and/or a broadcast channel, and a control section that finds out a resource where the predetermined signal is allocated, based on resource assignment information contained in the downlink control information and/or the broadcast channel, and the bit size of resource assignment information contained in the downlink control information and/or the broadcast channel is configured differently depending on a type of the predetermined signal.

Advantageous Effects of Invention

According to the present invention, signals can be transmitted and received properly in a radio communication system where communication is performed based on different configurations than existing LTE systems.

BRIEF DESCRIPTION OF DRAWINGS

FIG. 3 shows diagrams to explain resource assignment, where
FIG. 3A shows a case of an existing LTE system,
and FIG. 3B shows a case of an NR system;

FIG. 4 provide diagrams to show methods of allowing a base station to indicate common search space (C-SS) resources to user terminals, where

DESCRIPTION OF EMBODIMENTS

Figure 1B:
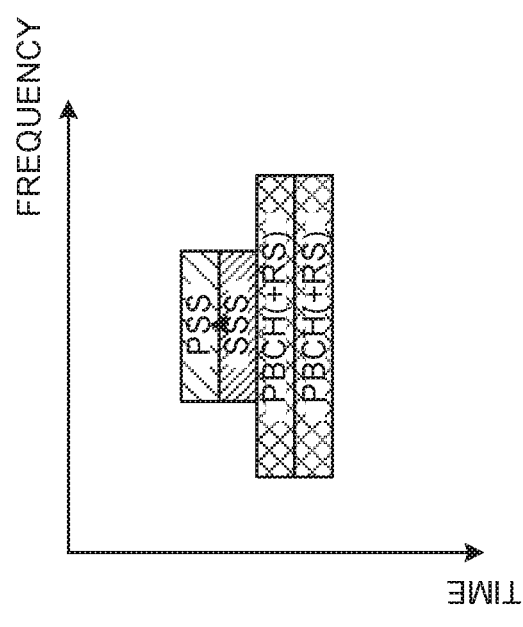
FIGS. 1A and 1B are diagrams to explain SS blocks.
Figure 1A:
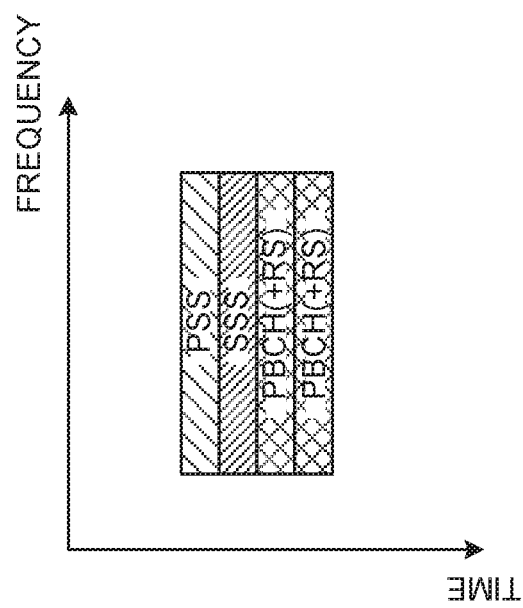

In the initial access process in existing LTE systems, a user terminal can at least detect time/frequency synchronization and a cell indicator (cell ID) by detecting synchronization signals (PSS/SSS). Also, after having established synchronization with the network and captured the cell ID, the user terminal receives a broadcast channel (for example, PBCH), which contains system information. Following the detection of synchronization signals and demodulation of a broadcast channel, the user terminal, for example, receives SIBs (System Information Blocks), transmits a PRACH (Physical Random Access Channel), and so on.

As described above, in existing LTE systems, a user terminal receives system information (broadcast information) that is necessary for downlink communication, in, for example, the MIB (Master Information Block), which is transmitted in the broadcast channel (PBCH). The broadcast channel for existing LTE systems (LTE-PBCH) is transmitted in subframe #0 in each radio frame, in a cycle of 10 msec, in a center band of 1.4 MHz (6 RBs in the center).

In the PBCH (MIB), information that is necessary to receive the downlink (downlink bandwidth, downlink control channel format, system frame number (SFN), etc.) is set forth in predetermined bits. The user terminal controls receipt of SIBs (System Information Blocks), which are communicated in the downlink shared data channel (PDSCH), based on the LTE-PBCH. By receiving SIBs, the user terminal can acquire minimum system information that is necessary to make communication.

Also, the locations to allocate synchronization signals (LTE-PSS/SSS) and the broadcast channel (LTE-PBCH) in existing LTE systems are fixed in time resources and frequency resources. To be more specific, LTE-PSS/SSS and the broadcast channel are mapped to the same frequency range (for example, 6 RBs at the center frequency) and transmitted. Thus, LTE-PSS/SSS and LTE-PBCH are transmitted from radio base stations in fixed resources, so that LTE-PSS/SSS and LTE-PBCH can be received without sending a special notice to the user terminal.

Even in future radio communication systems, a user terminal needs to receive synchronization signals and system information (MIB and/or SIB) in the initial access process and so on in order to perform communication using a newly introduced carrier (also referred to as "NR carrier (cell)").

<SS Blocks>

5G/NR are under study to define a resource unit that at least contains synchronization signals (for example, NR-PSS and/or NR-SSS (hereinafter also referred to as "NR-PSS/SSS")) and a broadcast channel (for example, NR-PBCH) as an "SS block," and allow communication using these SS blocks.

An SS block (synchronization signal block) is comprised of a number of contiguous OFDM symbols. For example, an NR-PSS symbol, an NR-SSS symbol and an NR-PBCH symbol are allocated in a row. Furthermore, the NR-PBCH may be allocated in a number of symbols (for example, 2 symbols), so that, in this case, an SS block may be comprised of 1 NR-PSS symbol, 1 NR-SSS symbol and 2 NR-PBCH symbols. Note that the order of allocating the NR-PSS/SSS and the NR-PBCH is not limited to this.

Also, the NR-PSS/SSS and the NR-PBCH may be configured to be mapped to the same frequency range (bandwidth), or may be configured to be mapped to different frequency ranges. Regarding the relationship between the locations of the NR-PSS/SSS and the NR-PBCH, their center frequencies may be configured to be aligned with each other, or their center frequency may be configured differently. The center frequency of an SS block may be regarded as the center frequency of the NR-PSS/SSS and/or the NR-PBCH, or may be configured independently of the center frequency of the NR-PSS/SSS and the center frequency of the NR-PBCH. Likewise, an edge part of an SS block may be regarded as an edge part of the NR-PSS/SSS and/or the NR-PBCH, or an edge part of an SS block may be configured independently of an edge part of the NR-PSS/SSS and an edge part of the NR-PBCH.

Now, future radio communication systems (5G/NR) are under research to provide services by using very high carrier frequencies such as 100 MHz, for example, there is an expectation that the frequency band to use for communication will expand, compared to existing LTE systems.

In this case, such communication may be possible in which a UE that is capable of communicating in a given continuous bandwidth (for example, 50 MHz) is allowed to connect to a carrier that controls communication in a 100-MHz bandwidth (also referred to as an "NR carrier," "NR-CC," etc.). In other words, a user terminal may be enabled to connect to an NR carrier, even if not capable of operating in wide bands.

For example, a frequency range equal to or less than a predetermined bandwidth is configured for a user terminal, and the user terminal may transmit and receive signals in this configured frequency range. This frequency range may be configured for every individual user terminal (that is, in a user terminal-specific manner). Also, the same frequency range may be configured for DL communication and for UL communication, or different frequency ranges may be configured. Also, when communicating using a number of component carriers (CC) (CA), one or multiple user terminal-specific frequency ranges may be configured per CC.

Figure 2:
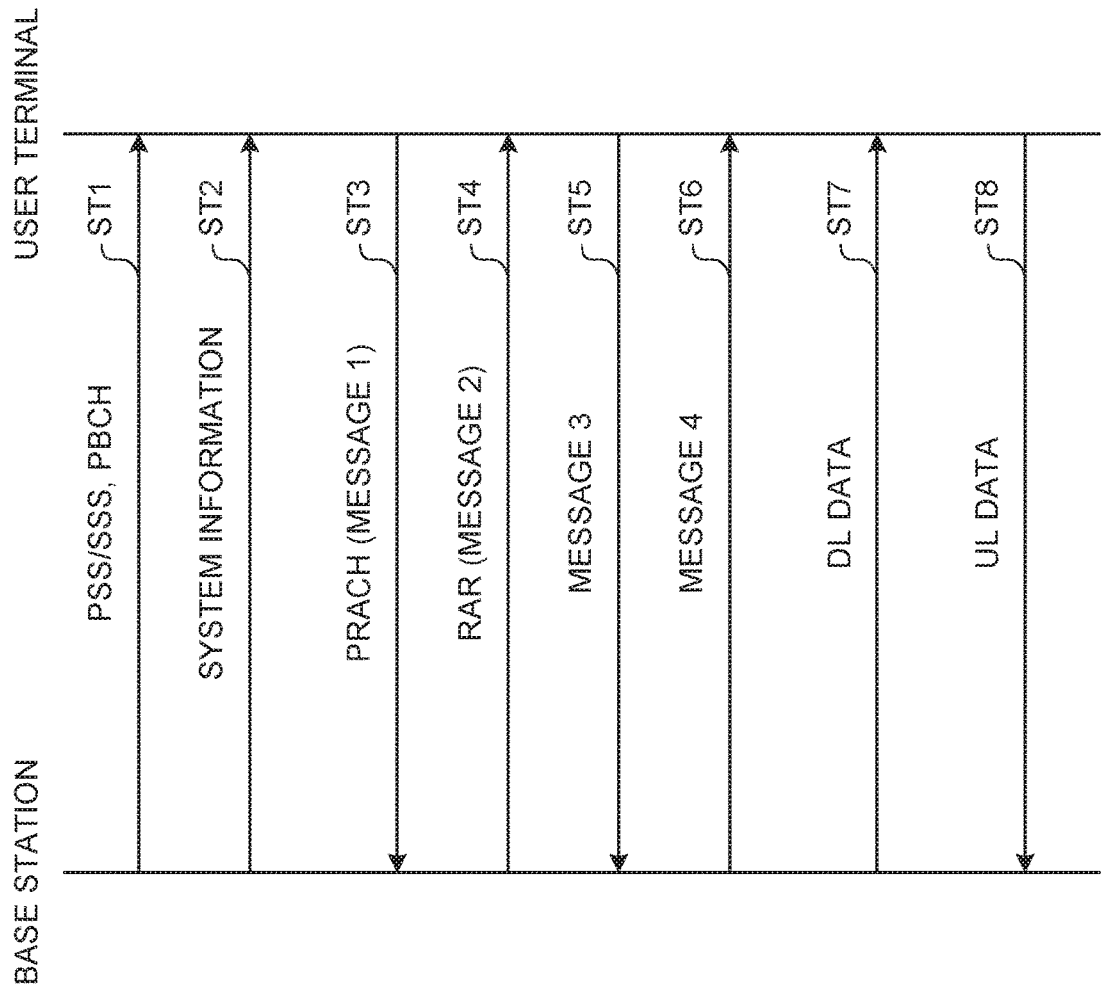
FIG. 2 is a diagram to explain the procedures from gaining initial access to establishing a connection.

Now, user terminal operations in the event control techniques for existing LTE systems are used on an as-is basis will be explained. FIG. 2 is a schematic diagram to explain the procedures from gaining initial access to establishing a connection. In FIG. 2, a base station transmits an SS block (PSS/SSS, PBCH), and a user terminal detects the SS block (ST 1). Also, the base station transmits system information to the user terminal (ST 2).

After that, the user terminal gains random access. That is, the user terminal transmits a PRACH (message 1) to the base station (ST 3), and the base station, having received the PRACH, transmits a RAR (Random Access Response) (message 2) to the user terminal (ST 4). After that, the user terminal transmits message 3 to the base station (ST 5), and the base station transmits message 4 to the user terminal (ST 6).

After a connection has been established, downlink data (DL data) is transmitted from the base station to the user terminal, and uplink data (UL data) is transmitted from the user terminal to the base station (ST 7 and ST 8).

In these procedures from gaining initial access to establishing a connection, the user terminal performs the following operations.

<Initial Access>

To gain initial access, the user terminal operates, for example, as follows:

- A user terminal detects an SS block (ST 1). That is, the user terminal monitors the bandwidth for SS blocks.
- The user terminal receives system information. That is, the user terminal monitors the bandwidth where system information is transmitted.
- The user terminal gains random access. That is, the user terminal operates in the RACH bandwidth.
- After an RRC (Radio Resource Control) connection is established, the user terminal has a user terminal-specific bandwidth for monitoring the U-SS (UE-specific search space) configured.

<Idle Mode>

To gain initial access, the user terminal operates, for example, as follows:

- The user terminal has a specific, paging-monitoring bandwidth configured.
- The user terminal has a specific bandwidth for making RRM (Radio Resource Management) measurements configured.

<Connected Mode>

To gain initial access, the user terminal operates, for example, as follows:

- The user terminal has a user terminal-specific bandwidth for monitoring the U-SS and performing CSI measurements configured.
- The user terminal has a specific bandwidth for making RRM (Radio Resource Management) measurements configured.

In the above-listed user terminal operations, it is necessary to report resource configurations, including resource assignment (resource allocation) information and the like.

For example, after an SS block is detected, the resource configuration of the PDCCH search space (common search space) for scheduling SIBs needs to be reported in the PBCH. Upon learning where the PDCCH search space is located, the user terminal monitors this PDCCH search space and detects downlink control information (DCI).

DCI to schedule SIBs indicates the location of the PDSCH that contains the SIBs. DCI to schedule a RAR indicates the location of the PDSCH that contains the RAR. A UL transmission command (UL grant) included in the RAR indicates the location of the PUSCH for random access message 3. DCI to schedule random access message 4 indicates the location of the PDSCH containing message 4. After a connection is established, DCI to schedule downlink data or uplink data indicates the location of the PDSCH or the PUSCH. Also, DCI to schedule SIBs and/or DCI in random access may indicate location of the user-specific search space for monitoring the PDSCH or the PUSCH.

The frequency band (bandwidth) which the user terminal has to monitor as described does not necessarily have to be the same in each of the above operations, and may vary. Meanwhile, in existing LTE systems, resource indices are defined based on the carrier bandwidth. That is, resources are allocated based on resource indices that apply in common to the above operations. Also, the number of bits in resource assignment is also determined based on the carrier bandwidth. For example, assuming that the carrier bandwidth is 20 MHz, in the event of DL resource assignment type is 0, the RBG (resource block group) size is 4 and the number of bits is 25, and, in the event of UL resource assignment type 0, which corresponds to contiguous allocation, the number of required bits is 13, which is smaller than that of the DL.

FIG. 3 shows diagrams to explain resource assignment, where FIG. 3A shows a case of an existing LTE system, and FIG. 3B shows a case of an NR system.

In existing LTE, as shown in FIG. 3A, synchronization signals (SS) and broadcast channel (PBCH) are always configured at the center of the LTE carrier (6 resource blocks (RBs)). Also, the base station reports the carrier frequency bandwidth to the user terminal by using the PBCH. Furthermore, the RB indices start from the resource block of the lowest carrier frequency.

It then follows that, when the user terminal detects up to the PBCH, the user terminal can identify the edge part of the carrier frequency, and learn which locations the RB indices point to. Each signal's scheduling is controlled by resource assignment (for example, RB allocation) included in DCI, and the number of bits of the resource assignment included in DCI is determined based on the carrier bandwidth.

Meanwhile, in 5G/NR, as shown in FIG. 3B, the SS/PBCH (for example, SS block) are not necessarily configured at the center of the NR carrier. Also, as shown in FIG. 3B, the bandwidth of the SS (12 RBs in FIG. 3B) may be different from the bandwidth of the PBCH (24 RBs in FIG. 3B).

Also, if the frequency band (frequency range) to monitor is configured for each user terminal, a user terminal does not need to monitor the whole carrier bandwidth of a wide band. In 5G/NR, where the frequency band is expanded, if the same control technique (for example, resource assignment method) as that of an existing LTE system is used on an as-is basis, the size of information (for example, resource assignment information) to report to user terminals increases and/or the load of transmitting/receiving processes on user terminals might increases, and this might make it difficult to communication properly.

Noting that not all user terminals will necessarily use the entire carrier bandwidth in future communication systems, and that resource assignment and/or others can be controlled separately depending on user terminal operations, the present inventors have come up with the idea that the bit size of resource assignment information contained in downlink control information and/or broadcast channels is configured, depending on the type of signal scheduled by each downlink control information and/or broadcast channel.

That is to say, a user terminal according to one aspect of the present invention has a receiving section that receives downlink control information that schedules a predetermined signal, and/or a broadcast channel, and a control section that finds out a resource where the predetermined signal is allocated, based on resource assignment information contained in the downlink control information and/or the broadcast channel, and the bit size of resource assignment information contained in the downlink control information and/or the broadcast channel is configured differently depending on a type of the predetermined signal.

According to one aspect of the present invention, in a user terminal, the resource assignment information preferably includes a pair of information that indicates an offset of the allocated resource and information that indicates a range, or information that indicates a predetermined resource offset from a plurality of resource offsets that are configured in advance. Also, according to one aspect of the present invention, in a user terminal, the configuration of a resource index included in the resource assignment information is preferably configured per user terminal.

With the present invention, a separate RB allocation bit size is defined for each DCI directed to a different process. For example, these processes include SIBs scheduling, RAR scheduling, message 3 scheduling in random access, message 4 scheduling in random access, DL/UL data scheduling and/or the like. The RB allocation bit size in DCI may be all configured differently per process, or may be configured to be common in part of the processes.

Also, RB indices, which include the granularity of RB allocation and/or the range of allocation, may be configured all differently. For example, some of the RB indices of the above DCI can be made user-specific. Also, RB allocation ranges in different DCIs (or PBCHs) may overlap partially or entirely.

The information required to determine user-specific RB indices is reported from the base station to the user terminal by, for example, RRC signaling. Here, the information that is required to determine user-specific RB indices includes user-specific indexing reference positions, the bandwidth to be monitored by each user, and the like. In 5G/NR systems, user terminals operate based on the premise that varying DCI payload sizes (at least varying RB allocation bit sizes) apply under various conditions.

Now, embodiments of the present invention will be described in detail below with reference to the accompanying drawings. Note that the configurations described hereinafter may be applied individually or may be applied in combination.

With the present embodiment, the reference positions for RB allocation and indices are defined individually in DCI for each process.

(Common Search Space Configuration Included in PBCH)

It is preferable that a user terminal finds out the resource where a common search space is allocated, which is specified by the PBCH, with respect to the position of an SS block as a reference position, based on resource assignment information included in the PBCH. This is because, for example, when detecting the PBCH upon initial access, only an SS block can be detected.

Figure 4A:
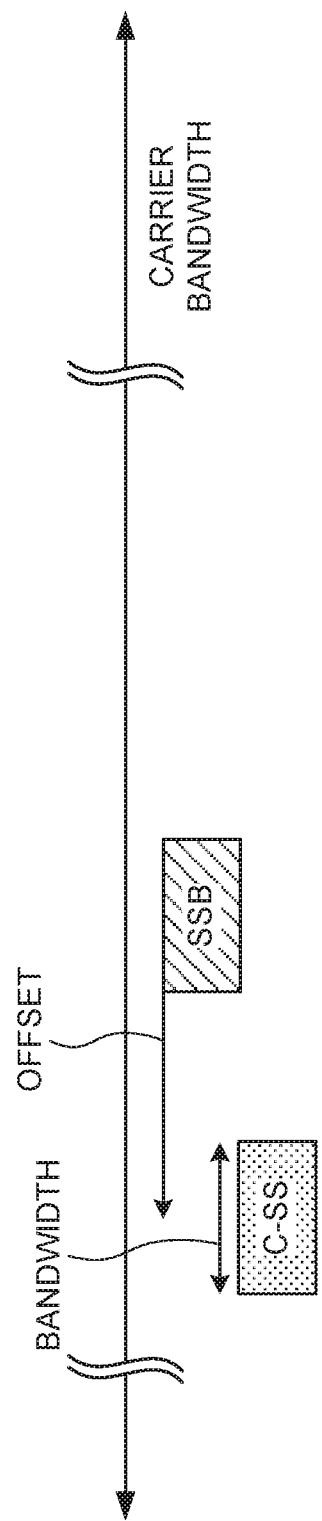
FIG. 4A is a diagram to explain a first method.

In this case, the base station can indicate the resource where the common search space (C-SS) is allocated, to the user terminal, by the following 2 methods. FIG. 4 provide diagrams to show methods of allowing a base station to indicate common search space (C-SS) resources to user terminals, where FIG. 4A is a diagram to explain a first method, and FIG. 4B is a diagram to explain a second method.

In the first method, the frequency offset from the position of an SS block (SSB) and the frequency resource (bandwidth or range) are configured by the base station, and the base station reports the frequency offset from the position of the SS block and the frequency resource. These frequency offset and frequency resource are reported to the user terminal by using the PBCH. Alternatively, if connected mode is already established, the frequency offset and the frequency resource may be reported to the user terminal by using higher layer signaling or the like. According to the first method, the frequency offset and the frequency resource are reported in separate fields, so that the frequency offset and frequency resource can be configured flexibly.

Figure 4B:
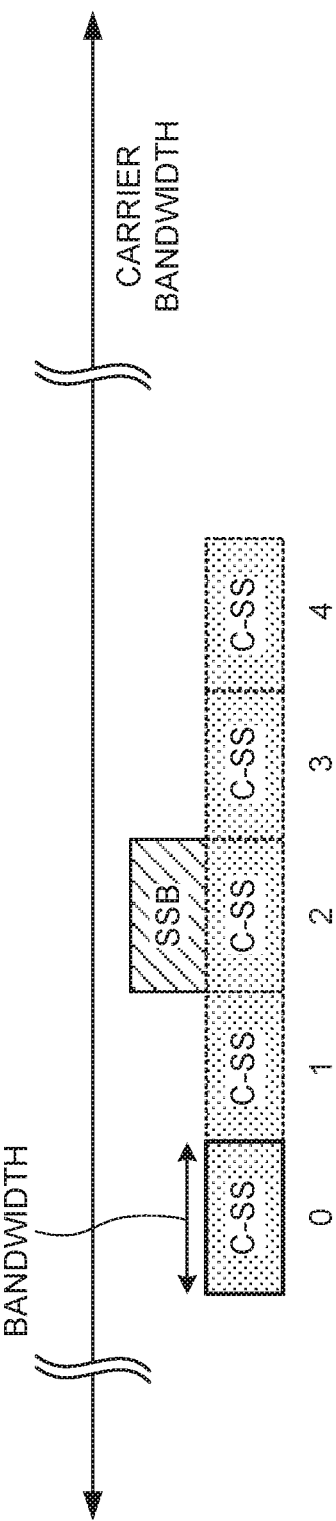
FIG. 4B is a diagram to explain a second method.

In the second method, as shown in FIG. 4B, candidate positions for the common search space (C-SS) with respect to an SS block are determined in advance, and predetermined candidates are reported to the user terminal. For example, in this method, each candidate position for the common search space is indexed (using indices 0 to 4 in FIG. 4B), and the base station reports predetermined indices to the user terminal. Information about these indices is reported to the user terminal by using the PBCH. Alternatively, if connected mode is already established, this information may be reported to the user terminal by using higher layer signaling or the like. In the second method, the frequency offset and frequency resource are reported, by reporting indices, by using one field, so that the number of bits required for this reporting can be reduced.

(Resource Assignment for System Information)

The user terminal finds out the resource where system information (for example, an SIB), which is specified by DCI, is allocated, with reference to a predetermined position, based on resource assignment information included in this DCI. The predetermined position may be the position of an SS block and/or the position of the PDCCH that schedules SIBs. Note that the number of bits of resource assignment information included in DCI can be defined in a way that is distinguishable from other modes of communication.

In this case, the base station can indicate the resource where an SIB is allocated, to the user terminal, by the following 2 methods. In the first method, the base station configures the frequency offset from the position of the SS block or the position of the PDCCH and the frequency resource (bandwidth), and the base station reports the frequency offset from the reference position and the frequency resource. These frequency offsets and frequency resource may be reported by higher layer signaling. According to the first method, the frequency offset and the frequency resource are reported in separate fields, so that the frequency offset and frequency resource can be configured flexibly.

According to the second method, how to transmit an SIB is determined in advance and an index is assigned to this, and the base station reports this index to the user terminal. Information about these indices and/or prospective frequency resources corresponding to these indices may be reported by higher layer signaling. In the second method, the frequency offset and frequency resource are reported, by reporting indices, by using one field, so that the number of bits required for this reporting can be reduced.

(Resource Assignment in Random Access Procedures)

In random access procedures, the position of an SS block, the position of an SIB, the carrier center based on carrier information reported in an SIB and so on can be used as the reference position for the allocated resource.

In random access procedures, the number of bits of resource assignment information included in DCI associated with each message (messages 1 to 4) and/or the reference position to apply to each resource assignment information may be configured differently or commonly. Alternatively, assuming that UL communication and DL communication take place, message 1 and message 3 may be configured in common, and message 2 and message 4 may be configured in common.

Alternatively, for each message (messages 1 to 4), the position of a position-scheduling signal and/or channel (for example, the PDCCH) may be used as a reference position. For example, for message 1 (PRACH), the position of an SIB (or common DCI) may be the reference position. For message 2 (RAR), the position of RAR-scheduling DCI (PDCCH) may be the reference position. For example, for message 3, the position of the RAR may be the reference position. For message 4, the position of the DCI (PDCCH) that schedules massage 4 may be the reference position.

The resource assignment information related to each message may be reported to the user terminal by using the first method or the second method described above.

(Resource Assignment for User Data)

The user terminal finds out the resource where the PDSCH to contain a predetermined signal (user data), which is specified by DCI, is allocated, by using at least one of the position of an SS block, the position of a PDSCH-scheduling PDCCH, and a predetermined position of a carrier as a reference position, based on resource assignment information included in the DCI. The user terminal finds out the resource where UL data (for example, PUSCH), specified by DCI, is allocated, by using at least one of the position of an SS block, the position of a PUSCH-scheduling PDCCH, and a predetermined position of a carrier as a reference position, based on resource assignment information included in the DCI.

In this case, the reference position in resource assignment may be the center or the edge of the user-specific bandwidth (the bandwidth configured when user-specific indexing (UE-specific indexing) is used). Also, in this case, the reference positions for the user-specific bandwidth indication and the user-specific search space indication are may be an SS block, the center of the system bandwidth, the edge of the system bandwidth and so on.

The resource assignment information related to user data may be reported to the user terminal by using the first method or the second method described above. For example, information related to frequency offsets and frequency resources (bandwidth) may be placed in data-scheduling DCI and reported to the user terminal (first method). The first method is suitable for use when DL data and/or UL data are allocated to contiguous resources.

Alternatively, information as to whether or not there is allocation may be included in data-scheduling DCI, by means of a bitmap and/or the like, for each index corresponding to a predetermined frequency band, and reported to the user terminal (second method). For example, cases might occur where DL data and/or UL data are allocated to non-contiguous resources (for example, RBs) in a predetermined frequency band. In this case, non-contiguous resources (for example, a number of RBs), which serves as a range for allocating data, may be indicated to the user terminal by using a bitmap included in downlink control information. Also, the unit of resources to be reported using the bitmap is not limited to the RB unit, and other resource units (for example, the RBG unit) may be used as well.

(Radio Communication System)

Now, the structure of the radio communication system according to one embodiment of the present invention will be described below. In this radio communication system, communication is performed using one of the radio communication methods according to the herein-contained embodiments of the present invention, or a combination of these.

Figure 5:
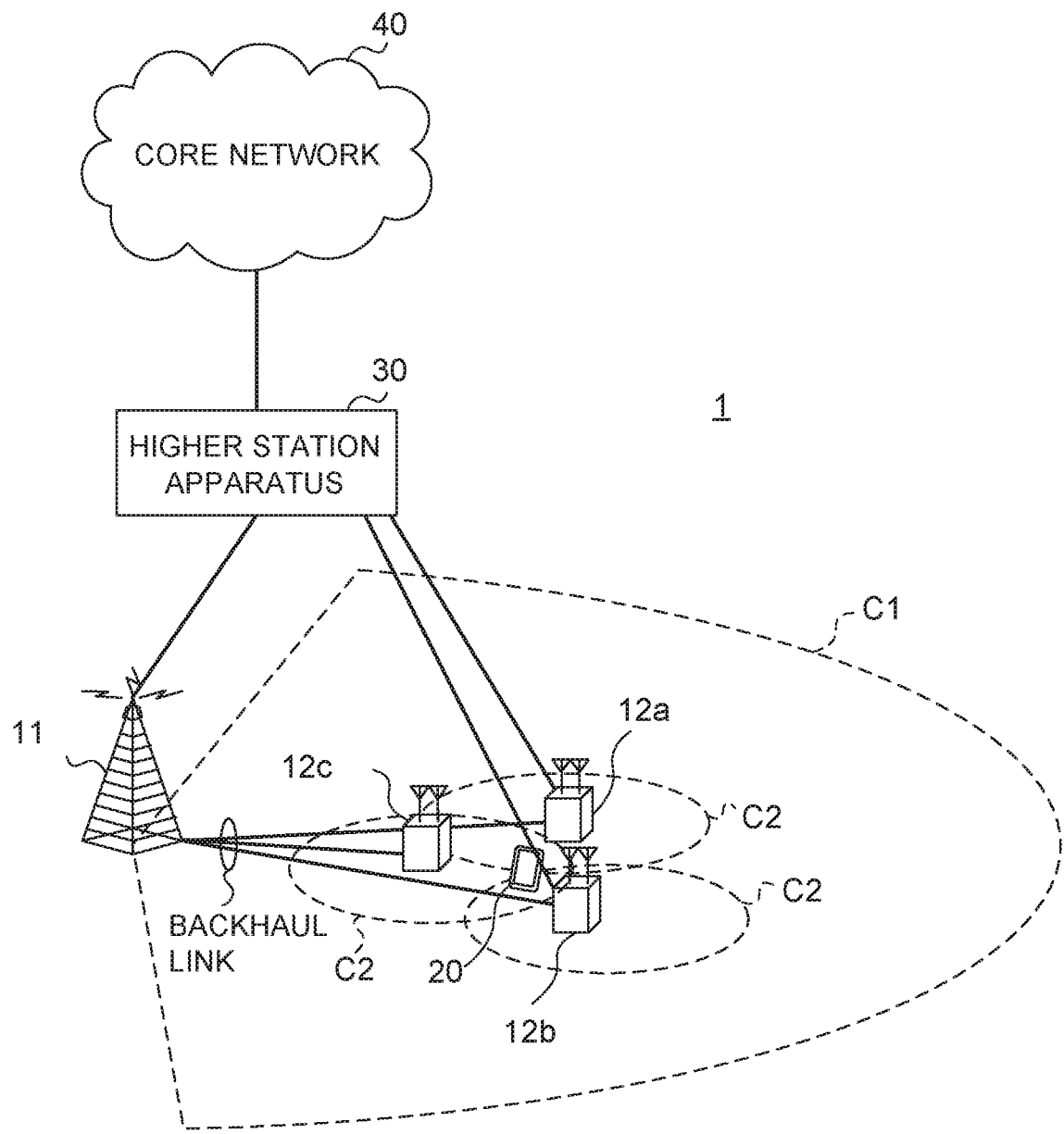
FIG. 5 is a diagram to show an exemplary schematic structure of a radio communication system according to one embodiment of the present invention.

FIG. 5 is a diagram to show an exemplary schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes 1 unit.

Note that the radio communication system 1 may be referred to as "LTE (Long Term Evolution)," "LTE-A (LTE-Advanced)," "LTE-B (LTE-Beyond)," "SUPER 3G, "IMT-Advanced," "4G (4th generation mobile communication system)," "5G (5th generation mobile communication system)," "NR (New Radio," "FRA (Future Radio Access)," "New-RAT (Radio Access Technology)" and so on, or may be seen as a system to implement these.

The radio communication system 1 includes a radio base station 11 that forms a macro cell C1, with a relatively wide coverage, and radio base stations 12a to 12c that are placed within the macro cell C1 and that form small cells C2, which are narrower than the macro cell C1. Also, user terminals 20 are placed in the macro cell C1 and in each small cell C2. The arrangement and number of cells and user terminals 20 are not limited to those illustrated in the drawing.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, 5 or fewer CCs or 6 or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

Furthermore, the user terminals 20 can communicate by using time division duplexing (TDD) and/or frequency division duplexing (FDD) in each cell.

Furthermore, in each cell (carrier), a single numerology may be used, or a plurality of different numerologies may be used.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or contiguous resource blocks per terminal, and allowing a plurality of terminals to use mutually different bands. Note that the uplink and downlink radio access schemes are not limited to the combinations of these, and other radio access schemes may be used as well.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH.

Note that scheduling information may be reported in DCI. For example, DCI to schedule receipt of DL data may be referred to as a "DL assignment," and DCI to schedule UL data transmission may also be referred to as a "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACK," "ACK/NACK," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated in the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRS (Sounding Reference Signal)), demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 6:
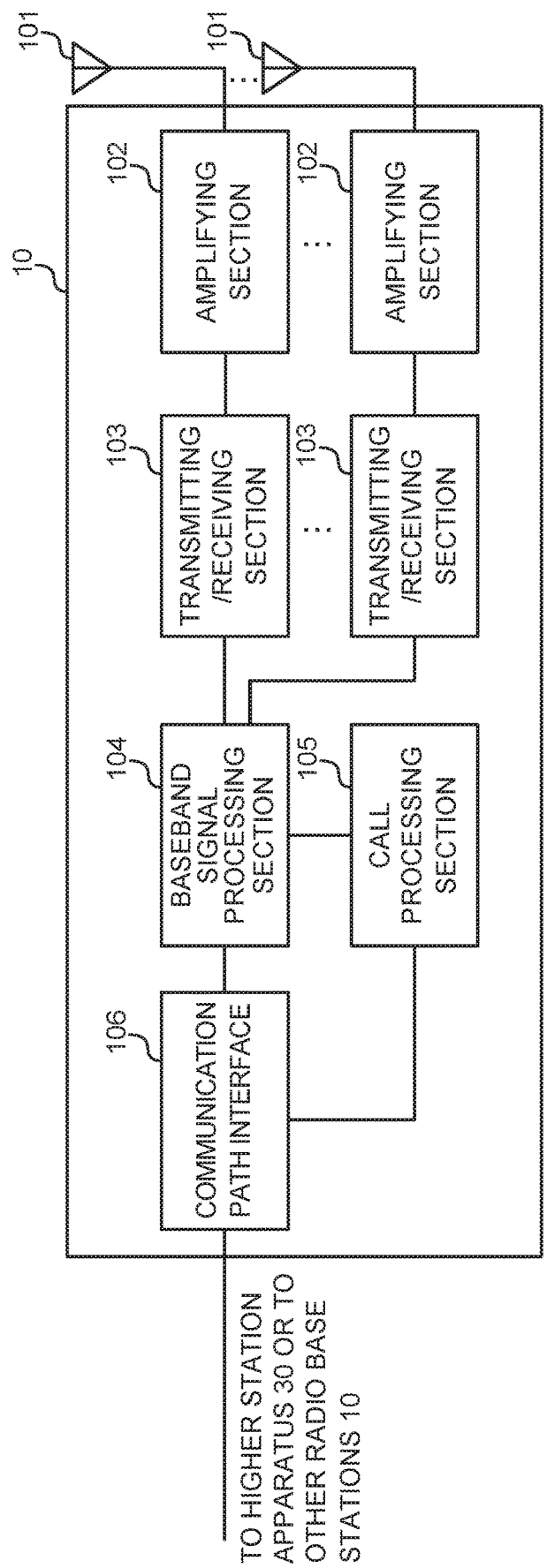
FIG. 6 is a diagram to show an exemplary overall structure of radio base station according to one embodiment of the present invention.

FIG. 6 is a diagram to show an exemplary overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing of communication channels (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

The transmitting/receiving sections 103 transmit one or more synchronization signal blocks (SS blocks) that contain synchronization signals (for example, the NR-PSS, NR-SSS, etc.) and a broadcast channel (for example, the NR-PBCH). The transmitting/receiving sections 103 may transmit the NR-PBCH with the same content and/or of the same configuration by using different multiple SS blocks.

The transmitting/receiving sections 103 transmit resource assignment information to the user terminal. The resource assignment information may include a bitmap that shows the indices of allocating resources, reference positions in the frequency domain, frequency bandwidth, offsets from the reference position, and so forth.

Figure 7:
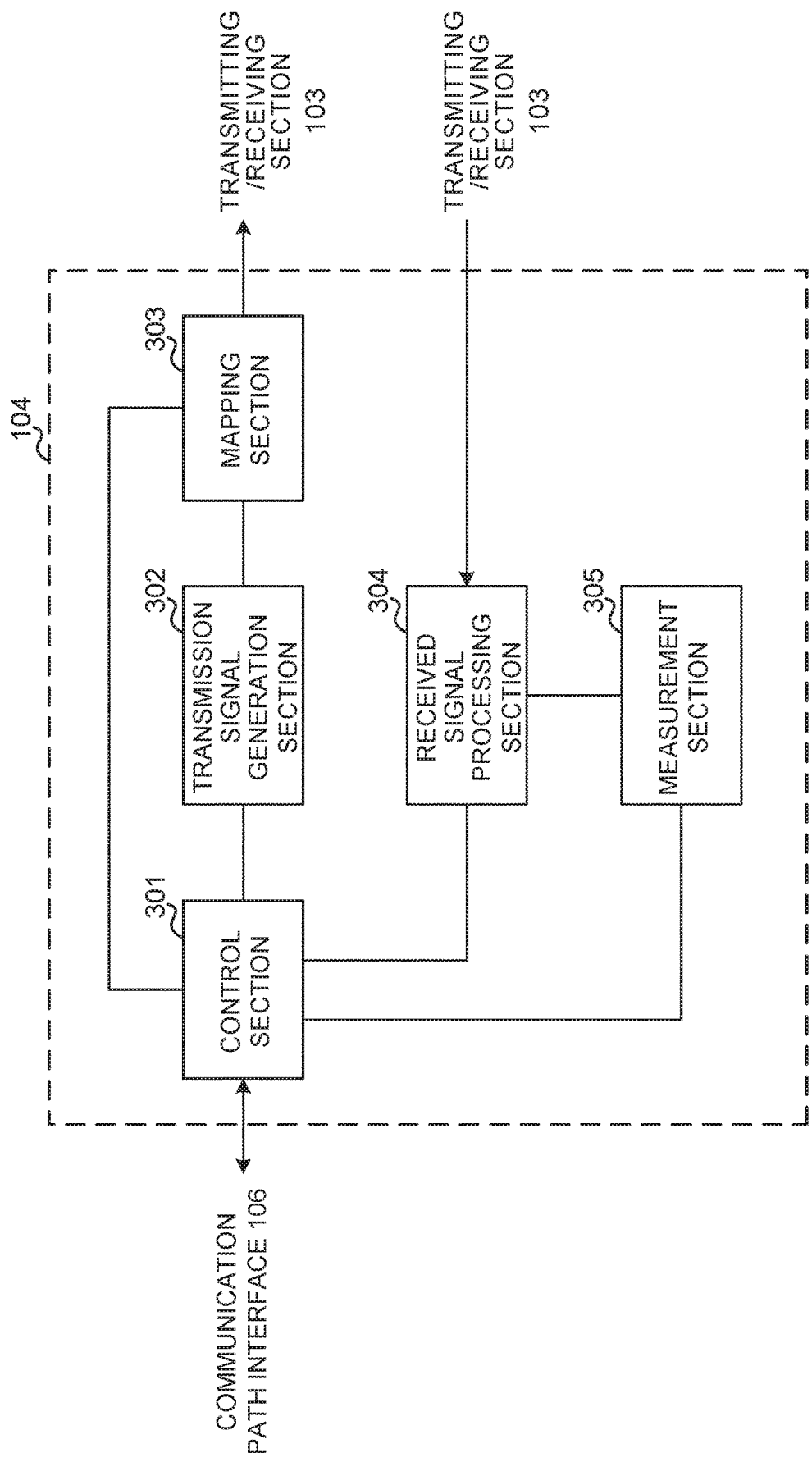
FIG. 7 is a diagram to show an exemplary functional structure of radio base station according to one embodiment of the present invention.

FIG. 7 is a diagram to show an exemplary functional structure of a radio base station according to one embodiment of the present invention. Note that, although this example primarily shows functional blocks that pertain to characteristic parts of the present embodiment, it may be assumed that the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 401, for example, controls generation of signals in the transmission signal generation section 402, allocation of signals in the mapping section 403, and so on. Furthermore, the control section 301 controls signal receiving processes in the received signal processing section 304, measurements of signals in the measurement section 305, and so on.

The control section 301 controls the scheduling (for example, resource assignment) of system information, downlink data signals (for example, signals transmitted in the PDSCH) and downlink control signals (for example, signals transmitted in the PDCCH and/or the EPDCCH, such as delivery acknowledgment information). Also, the control section 301 controls the generation of downlink control signals, downlink data signals and so on, based on the results of deciding whether or not retransmission control is necessary for uplink data signals, and so on. Also, the control section 301 controls the scheduling of synchronization signals (for example, PSS (Primary Synchronization Signal)/SSS (Secondary Synchronization Signal)), downlink reference signals (for example, CRS, CSI-RS, DMRS, etc.) and so on.

The control section 301 also controls the scheduling of uplink data signals (for example, signals transmitted in the PUSCH), uplink control signals (for example, signals transmitted in the PUCCH and/or the PUSCH, such as delivery acknowledgment information), random access preambles (for example, signals transmitted in the PRACH), and uplink reference signals.

The control section 301 configures the bit size of resource assignment information that is included in DCI and/or in the PBCH, depending on the types of predetermined signals. The types of predetermined signals include, for example, the common search space included in the PBCH, system information, signals in random access procedures, user data, and so forth. Obviously, the types of predetermined signals are not limited to these.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and UL grants, which report uplink data allocation information, based on commands from the control section 301. DL assignments and UL grants are both DCI, in compliance with DCI formats. Also, the downlink data signals are subjected to the coding process, the modulation process and so on, by using coding rates and modulation schemes that are selected based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs information that has been decoded through receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signal. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), SNR (Signal to Noise Ratio), the signal strength (for example, RSSI (Received Signal Strength Indicator)), transmission path information (for example, CSI), and so on. The measurement results may be output to the control section 301.

(User Terminal)

Figure 8:
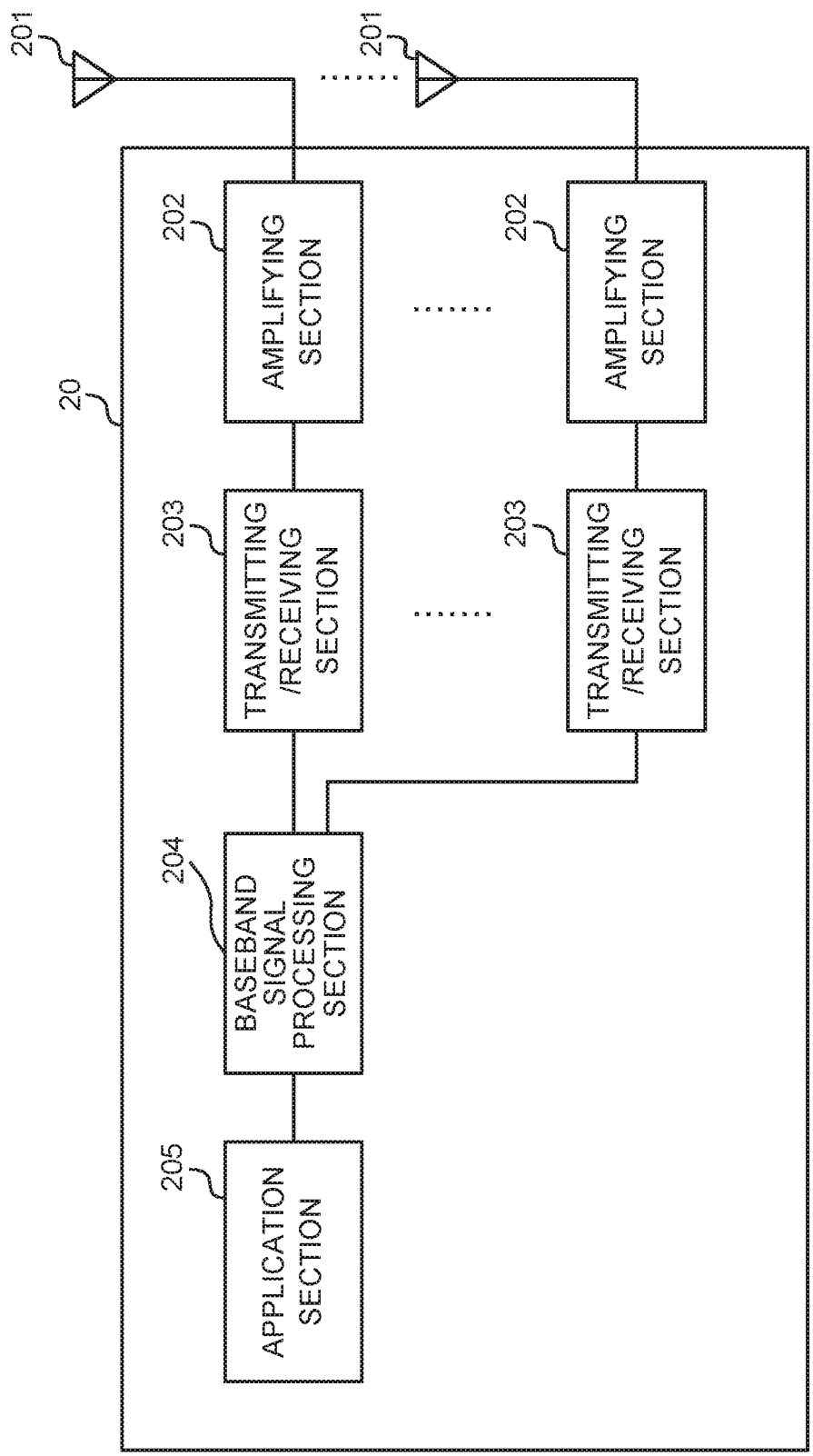
FIG. 8 is a diagram to show an exemplary overall structure of a user terminal according to one embodiment of the present invention.

FIG. 8 is a diagram to show an exemplary overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process and so on. Downlink user data is forwarded to the application section 205. The application section 205 performs processes related to higher layers above the physical layer and the MAC layer, and so on. Also, in the downlink data, the broadcast information may be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

The transmitting/receiving sections 203 transmit one or more synchronization signal blocks (SS blocks) that contain synchronization signals (for example, the NR-PSS, NR-SSS, etc.) and a broadcast channel (for example, the NR-PBCH). The transmitting/receiving sections 203 may joint-receive NR-PBCHs included in different multiple SS blocks, respectively, based on information on joint receipt of the NR-PBCH.

Figure 9:
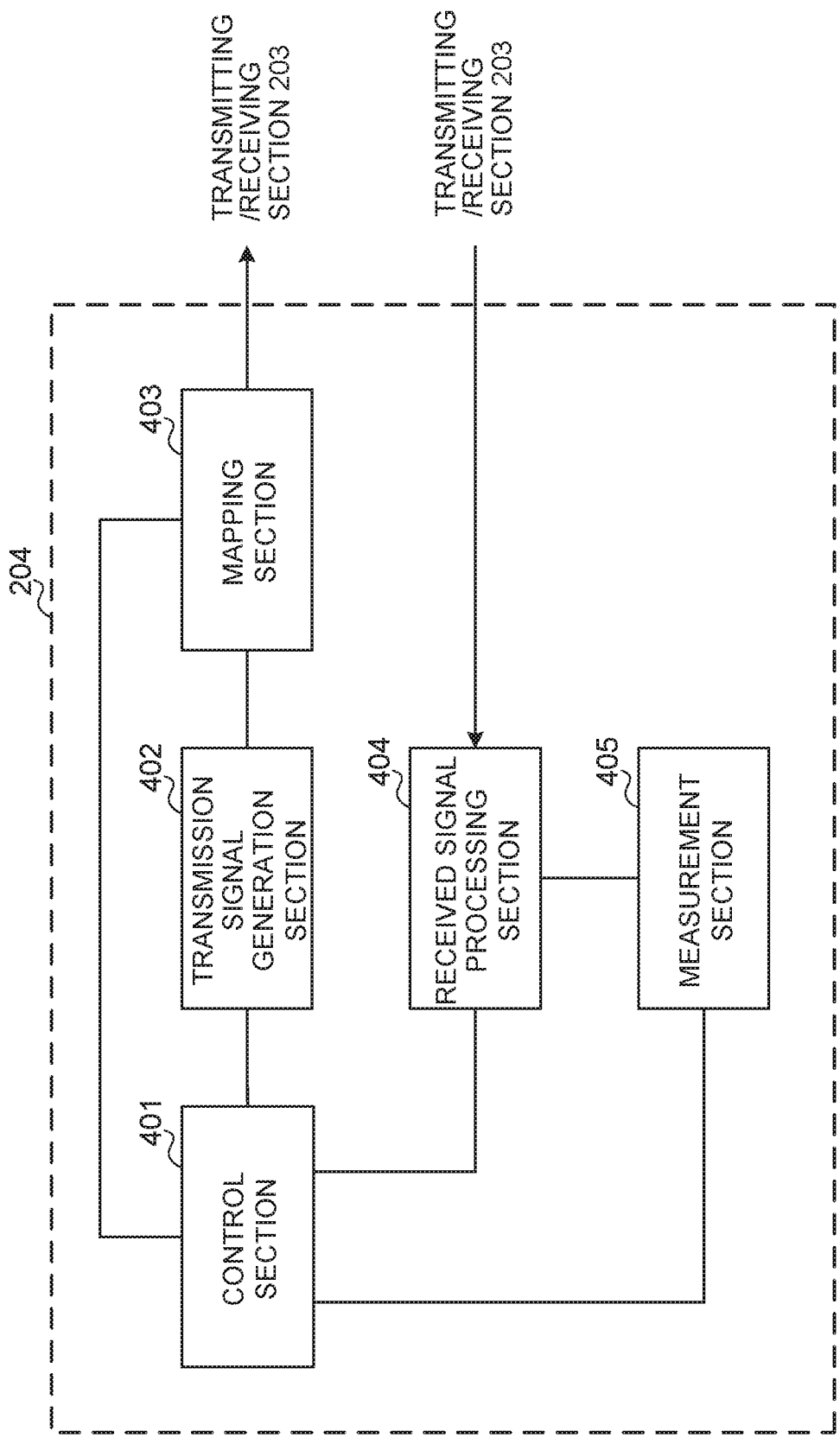
FIG. 9 is a diagram to show an exemplary functional structure of a user terminal according to one embodiment of the present invention.

FIG. 9 is a diagram to show an exemplary functional structure of a user terminal according to one embodiment of the present invention. Note that, although this example primarily shows functional blocks that pertain to characteristic parts of the present embodiment, it may be assumed that the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls generation of signals in the transmission signal generation section 402, allocation of signals in the mapping section 403, and so on. Furthermore, the control section 401 controls signal receiving processes in the received signal processing section 404, measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

The control section 401 determines the resource assignment of predetermined signals based on resource assignment information contained in DCI and/or in the PBCH.

It is preferable that a user terminal finds out the resource where a common search space, which is specified by the PBCH, is allocated, with respect to the position of an SS block as a reference position, based on resource assignment information included in the PBCH.

The user terminal finds out the resource where a PDSCH to contain a predetermined signal, which is specified by DCI, is allocated, by using at least one of the position of an SS block, the position of a PDSCH-scheduling PDCCH, and a predetermined position of a carrier as a reference position, based on resource assignment information included in the DCI.

The control section 401 finds out the resource where an SIB, which is specified by DCI, is allocated, by using the position of an SS block and/or the position of the PDCCH that schedules the SIB, as reference positions, based on resource assignment information included in the DCI.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information and/or channel state information (CSI) based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs information that has been decoded through receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, SNR, etc.), the signal strength (for example, RSSI), transmission path information (for example, CSI) and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 10:
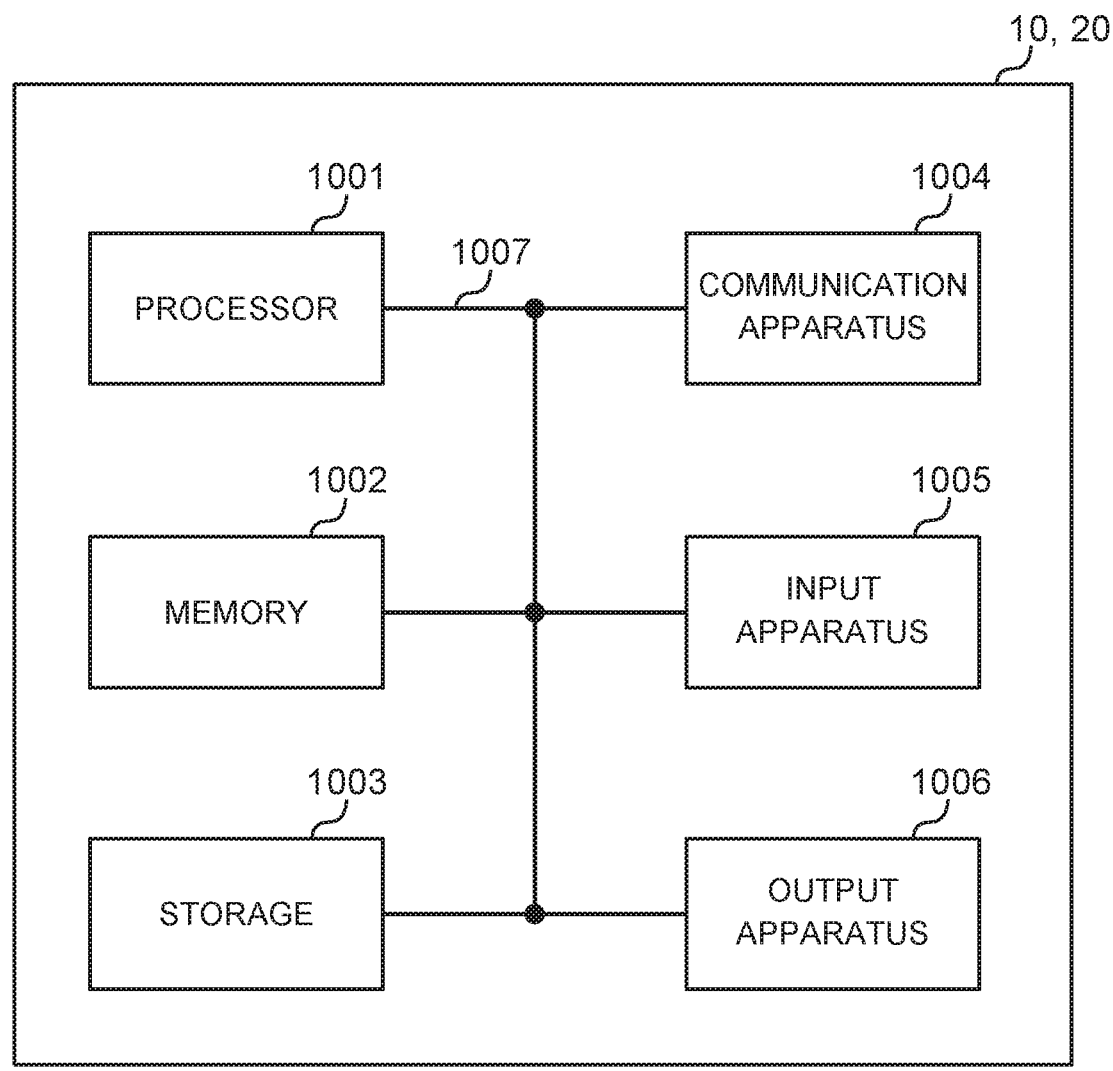
FIG. 10 is a diagram to show an exemplary hardware structure of a radio base station and a user terminal according to one embodiment of the present invention.

For example, the radio base station, user terminals and so on according to one embodiment of the present invention may function as a computer that executes the processes of the radio communication method of the present invention. FIG. 10 is a diagram to show an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on one or more processors. Note that the processor 1001 may be implemented with one or more chips.

The functions of the radio base station 10 and the user terminal 20 are implemented by allowing hardware such as the processor 1001 and the memory 1002 to read predetermined software (programs), thereby allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or multiple slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single-carrier Frequency Division Multiple Access) symbols, and so on). Also, a slot may be a time unit based on numerology. Also, a slot may include a plurality of minislots. Each minislot may be comprised of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, 1 subframe may be referred to as a "transmission time interval (TTI)," or a plurality of consecutive subframes may be referred to as a "TTI," or 1 slot or mini-slot may be referred to as a "TTI." That is, a subframe and/or a TTI may be a subframe (1 ms) in existing LTE, may be a shorter period than 1 ms (for example, one to 13 symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when one slot or one minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time length of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," "a partial TTI (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource assignment in the time domain and the frequency domain, and may include one or a plurality of consecutive subcarriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, minislots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented using other applicable information. For example, a radio resource may be specified by a predetermined index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent in an implicit way (for example, by not reporting this piece of information, by reporting another piece of information, and so on).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, 3) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an "uplink channel" may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between two or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between 2 elements that are "connected" or "coupled" to each other. The coupling or connection between the elements may be physical, logical or a combination of these. For example, "connection" may be interpreted as "access."

As used herein, when 2 elements are connected, these elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical (both visible and invisible) regions.

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
   a receiver that receives a synchronization signal block containing a synchronization signal and a broadcast channel; and
   a processor that determines an allocation resource for a common search space, indicated by the broadcast channel, based on a position of the synchronization signal block as a reference position, wherein the receiver receives information regarding a frequency offset from the position of the synchronization signal block, and regarding a frequency resource.

2. The terminal according to claim 1, wherein the processor determines an allocation resource for a downlink shared channel, which notifies system information, based on a position of a downlink control channel that schedules the downlink shared channel.

3. The terminal according to claim 1, wherein the processor determines the allocation resource for the common search space based on resource allocation information contained in the broadcast channel.

4. The terminal according to claim 2, wherein the processor determines the allocation resource for the common search space based on resource allocation information contained in the broadcast channel.

5. A radio communication method performed by a terminal, the radio communication method comprising:
receiving a synchronization signal block containing a synchronization signal and a broadcast channel; and
determining an allocation resource for a common search space, indicated by the broadcast channel, based on a position of the synchronization signal block as a reference position,
wherein the terminal receives information regarding a frequency offset from the position of the synchronization signal block, and regarding a frequency resource.

6. A base station comprising:
a transmitter that transmits a synchronization signal block containing a synchronization signal and a broadcast channel; and
a processor that determines an allocation resource for a common search space, indicated by the broadcast channel, based on a position of the synchronization signal block as a reference position,
wherein the transmitter transmits information regarding a frequency offset from the position of the synchronization signal block, and regarding a frequency resource.

7. A system comprising a terminal and a base station, wherein:
the terminal comprises:
a receiver that receives a synchronization signal block containing a synchronization signal and a broadcast channel; and
a processor of the terminal that determines an allocation resource for a common search space, indicated by the broadcast channel, based on a position of the synchronization signal block as a reference position,
wherein the receiver receives information regarding a frequency offset from the position of the synchronization signal block, and regarding a frequency resource, and
the base station comprises:
a transmitter that transmits the synchronization signal block; and
a processor of the base station that determines the allocation resource for a common search space, indicated by the broadcast channel, based on the position of the synchronization signal block as the reference position,
wherein the transmitter transmits the information regarding the frequency offset from the position of the synchronization signal block, and regarding the frequency resource.

* * * * *